UNITED STATES PATENT OFFICE.

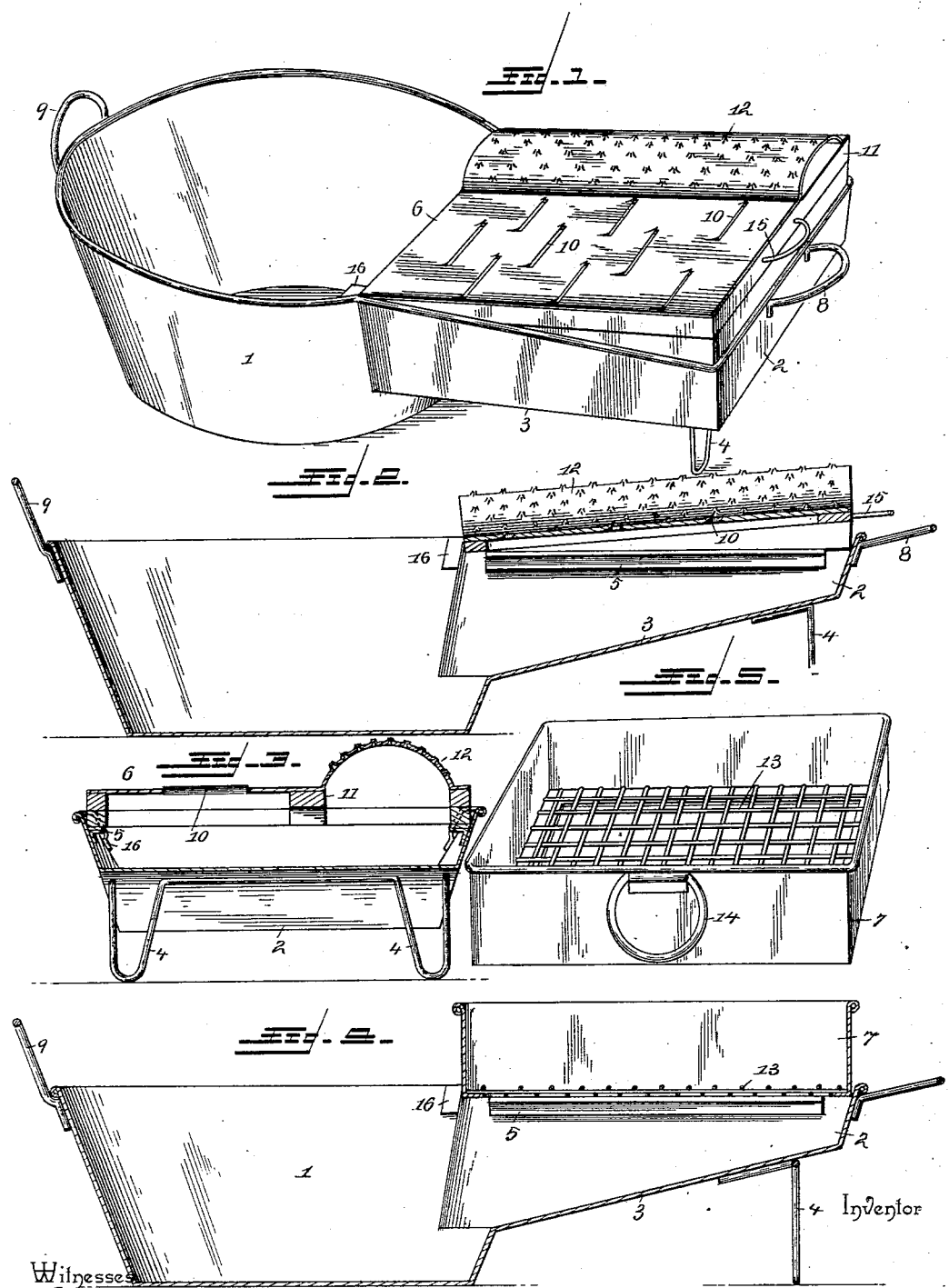

FIELDON B. CUNNINGHAM, OF BURLINGTON, KANSAS, ASSIGNOR OF ONE-HALF TO CARROW A. CUNNINGHAM, OF SAME PLACE.

VEGETABLE CUTTER, GRATER, AND DISH DRAINER.

SPECIFICATION forming part of Letters Patent No. 564,595, dated July 28, 1896.

Application filed December 26, 1895. Serial No. 573,357. (No model.)

*To all whom it may concern:*

Be it known that I, FIELDON B. CUNNINGHAM, a citizen of the United States, residing at Burlington, in the county of Coffey and State of Kansas, have invented a new and useful Vegetable Grater, Cutter, and Dish-Drainer, of which the following is a specification.

The invention relates to improvements in vegetable slicers or cutters and dish-drainers.

The object of the present invention is to provide a simple and inexpensive device which may be readily arranged for conveniently cutting, slicing, or grating vegetables and the like, and which may be quickly converted into an efficient dish-drainer to facilitate dish-washing.

The invention consists in the construction and novel combination and arrangement of parts hereinafter fully described, illustrated in the accompanying drawings, and pointed out in the claims hereto appended.

In the drawings, Figure 1 is a perspective view of a device constructed in accordance with this invention and shown arranged for slicing and grating. Fig. 2 is a longitudinal sectional view of the same. Fig. 3 is a transverse sectional view, the parts being arranged as shown in Fig. 1. Fig. 4 is a longitudinal sectional view, the parts being arranged to form a dish-drainer. Fig. 5 is a detail perspective view of the draining receptacle.

Like numerals of reference indicate corresponding parts in all the figures of the drawings.

1 designates a pan or receptacle constructed of any suitable material and provided at one side with a rectangular extension 2, having an inclined bottom 3, which forms a chute, and which is adapted to direct liquid matter or chopped material into the body of the pan or receptacle 1. The pan or receptacle 1 is preferably round, but it may be of any desired configuration, and the inclined bottom 3 of the extension 2 is located above the bottom of the pan or receptacle 1, and is supported near the outer end of the extension by legs 4, constructed of wire or any other suitable material.

The sides of the extension 2 are provided at their inner faces with horizontal ribs or flanges 5, which are adapted to support a vegetable grater and slicer 6 and a draining receptacle 7, either one of which is adapted to be used in connection with the pan or receptacle 1 and its extension. The end of the extension is provided with a handle 8, and the pan or receptacle 1 is provided at a diametrically opposite point with a handle 9 to enable the device to be readily carried.

The slicer and cutter 6 is constructed of suitable material and is provided at intervals with transversely-disposed cutting-blades 10, preferably formed integral with the body of the slicer, and the formation of the knives provides openings in advance of the cutting-edges and beneath them for the passage of the material severed or sliced, and the material will fall down the inclined bottom of the extension and collect in the pan or receptacle 1. This slicer is provided with a rectangular supporting-frame 11, and it is provided at one side with a longitudinally-disposed grater 12, preferably formed integral with the slicer and having a suitable grating-surface.

The frame 11 fits within the upper edges of the extension 2 and is supported by the flanges or ribs 5, and the sides of the frame are constructed substantially triangular to give the slicer and grater a slight inclination in the direction of the receptacle or pan 1.

The draining receptacle 7 may be of any suitable construction, but it is preferably provided with a wire-gauze or woven-wire bottom 13 to enable, when the pan or receptacle 1 is employed for washing dishes, the dishes after washing to be placed in the draining receptacle to cause the water to drain from them and to flow back to the pan or receptacle 1. The draining receptacle is provided at opposite sides with handles 14, and the grater and slicer is provided at its outer end with a handle 15. The outer ends of the frame 11 and the draining receptacle abut against the outer end of the extension, and stops 16 are arranged at the inner end of the extension to prevent the slicer and grater or the draining receptacle from moving in the direction of the pan or receptacle 1.

It will be seen that the device is simple and inexpensive in construction, and that it may be readily arranged to provide a cutter, slicer, and grater or a dish pan and drainer.

Changes in the form, proportion, and the minor details of construction may be resorted to without departing from the principle or sacrificing any of the advantages of this invention.

What I claim is—

1. In a device of the class described, the combination of a pan or receptacle provided with a substantially rectangular extension having an inclined bottom, horizontal ribs or flanges arranged at opposite sides of the extension, and stops arranged at the inner terminals of the flanges, said extension being adapted for the reception of a slicer or dish-drainer, and the stops being adapted to engage the inner end of the same, and the outer end of the extension being adapted to hold the drainer or slicer against outward movement, substantially as and for the purpose described.

2. In a device of the class described, the combination of a pan or receptacle provided with a substantially rectangular extension having an inclined bottom, and provided at opposite sides with horizontal ribs or flanges, stops arranged at the inner terminals of the flanges, and a slicer provided with a supporting-frame and arranged at a slight inclination, and having series of cutting-edges, and slots or openings, substantially as described.

3. In a device of the class described, the combination of a pan or receptacle provided with a substantially rectangular extension having an inclined bottom, and provided at opposite sides with horizontal ribs or flanges, stops arranged at the inner terminals of the flanges, a rectangular supporting-frame mounted on the ribs or flanges, a slicer arranged at one side of the supporting-frame and provided with cutting-edges, and a grater located at the opposite side of the supporting-frame and disposed longitudinally of the same, substantially as described.

In testimony that I claim the foregoing as my own I have hereto affixed my signature in the presence of two witnesses.

FIELDON B. CUNNINGHAM.

Witnesses:
J. D. FRAZIER,
C. D. WHARTON.